United States Patent [19]

St. Clair

[11] 4,391,949
[45] Jul. 5, 1983

[54] ASYMMETRIC BLOCK COPOLYMERS AND CORRESPONDING ADHESIVE FORMULATIONS

[75] Inventor: David J. St. Clair, Houston, Tex.

[73] Assignee: Shell Oil Company, Houston, Tex.

[21] Appl. No.: 320,233

[22] Filed: Nov. 12, 1981

[51] Int. Cl.$^3$ .............................................. C08L 9/00
[52] U.S. Cl. ..................................... 525/99; 524/274; 524/505
[58] Field of Search ........................................... 525/99

[56] References Cited

U.S. PATENT DOCUMENTS

| | | | |
|---|---|---|---|
| 3,766,295 | 10/1973 | Crossland et al. | 525/99 |
| 3,975,460 | 8/1976 | Davison et al. | 525/99 |
| 4,096,203 | 6/1978 | St. Clair | 525/99 |

*Primary Examiner*—Melvyn I. Marquis

[57] ABSTRACT

A novel block copolymer having particular utility in adhesive compositions has the structure $(A-B)_x-Y-(C)_z$ where A is a poly(monoalkenyl) block, B and C are poly(conjugated diene) polymer blocks, Y is the residue of a multifunctional coupling agent, and x plus z is greater than 6. Also disclosed are adhesive compositions containing such block copolymers.

17 Claims, No Drawings

ASYMMETRIC BLOCK COPOLYMERS AND CORRESPONDING ADHESIVE FORMULATIONS

BACKGROUND OF THE INVENTION

1. Field of the Invention

This is directed to a star-shaped, assymetric polymer. More particularly, this invention is directed to a star-shaped block copolymer having monoalkenyl arene-conjugated diene copolymer arms and conjugated diene homopolymer arms. Further, adhesive compositions containing such block copolymers are also part of the invention.

2. Description of the Prior Art

Block copolymers have been increasingly employed in adhesive compositions primarily because of their high cohesive strengths and their ability to "cross-link" without a chemical vulcanization step. These block copolymers, such as those described in Harlan, U.S. Pat. No. 3,239,478, are primarily either linear or radial styrene-butadiene or styrene-isoprene block copolymers. The linear copolymers typically have the structure styrene-butadiene-styrene or styrene-isoprene-styrene. The high cohesive strength of these styrene-diene block copolymers is primarily attributed to their network structure resulting from their well-known domain formation.

However, this very high cohesive strength is often a detrimental quality in certain applications. For example, it is known that in adhesives based on natural rubber or SBR, aggressive tack is inversely related to cohesive strength. That is, as the rubber is crosslinked to a higher degree, the cohesive strength increases but the aggressive tack decreases. Previous patents disclose adhesive compositions containing block copolymers which impart very high cohesive strength to the adhesive. In formulations containing only block copolymer and tackifying resin, aggressive tack is marginal and oil is normally required in the formulation to improve aggressive tack. If some way were found to reduce the cohesive strength of the block copolymer used in an adhesive formulation, substantially improved aggressive tack could be obtained, even in formulations which do not contain oil.

One way to reduce cohesive strength is by reducing coupling yield of the SIS polymer or by blending the polymer with a high molecular weight SI diblock copolymer. Such mechanisms are disclosed in U.S. Pat. No. 4,096,203. These approaches should indeed lower cohesive strength and give less elasticity and better conformability. However, they also cause a reduction in the upper service temperature of the adhesive. In pressure sensitive adhesive (PSA) label applications, in which service temperature requirements are modest, such low coupled versions have had some success. However, in PSA tapes which must bear significant load at 60° to 70° C., such block copolymers have proved to be of little use.

A new block copolymer has been found which has a unique set of property advantages.

SUMMARY OF THE INVENTION

The present invention is directed to a novel block copolymer having reduced cohesive strength and solution viscosity without significantly reducing the upper service temperature. In particular, the present invention is directed to a block copolymer having the star-shaped, assymetrical structure

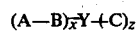

where A is a polymer block of a monoalkenyl arene, B is a polymer block of a conjugated diene, C is a polymer block of a conjugated diene, Y is the residue of a multifunctional coupling agent, the sum of x plus z is greater than 6 and less than about 30, and the ratio of x to z is between about 5 to 1 and about 1 to 5.

As shown in the Illustrative Embodiments which follow, adhesive compositions containing block copolymers of the present invention have a most desirable balance of properties. The adhesive compositions have reduced cohesive strength and viscosity without reduced service temperatures as measured by SAFT values. Quite unexpectedly, the SAFT to Kraft values for adhesives containing the subject block copolymers are nearly 9° C. higher than comparable values for adhesives containing linear SIS block copolymers.

DETAILED DESCRIPTION OF THE INVENTION

The block copolymers of the present invention have an idealized structure as follows:

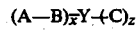

The A blocks are polymer blocks of a monoalkenyl arene. Preferably, the monoalkenyl arene is styrene. Other useful monoalkenyl arenes from which the thermoplastic (non-elastomeric) blocks may be formed include alphamethyl styrene, tertbutyl styrene, paramethyl styrene and the other ring alkylated styrenes as well as mixtures of the same.

The B and C blocks are polymer blocks of conjugated dienes. Preferred dienes include butadiene and isoprene. A much preferred diene is isoprene. While the conjugated diene employed in the B block may differ from that employed in the C block, it is preferred that the same diene be employed in both blocks. Mixtures of conjugated dienes may also be employed.

The Y moiety stands for the residue of a multifunctional coupling agent. As discussed more fully below, it is preferred that the coupling agent residue be the residue of a divinyl benzene coupling agent.

The letters x and z stand for the relative number of arms in each polymer molecule. Accordingly, x and z are integers when referring to a single polymer molecule. However, a polymer mass will necessarily contain molecules of varying functionality. With regard to the present invention, it is important that, for the average molecule in the polymer mass, the sum of x and z be at least six or greater, therein resembling a star-shaped polymer molecule. Preferably the number of polymer arms (x plus z) is between about 6 and 30, more preferably between about 8 and about 20.

The ratio of x arms to z arms has an effect on a number of properties including the tensile strength of the polymer. Preferably, the ratio of x to z is between about 5 to 1 and about 1 to 5, more preferably between about 3 to 1 and about 1 to 3.

For certain adhesive applications a much preferred polymer would have the structure

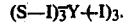

Expressed another way, the average molecule in the polymer mass would have the structure as follows:

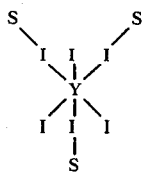

The polymers of the present invention are produced by anionic polymerization employing an organomonolithium initiator. The first step of the process involves contacting the monoalkenyl arene and the organomonolithium compound (initiator) in the presence of an inert diluent therein forming a living polymer compound having the simplified structure A-Li. The monoalkenyl arene is preferably styrene. The inert diluent may be an aromatic or naphthenic hydrocarbon, e.g., benzene or cyclohexane, which may be modified by the presence of an alkene or alkane such as pentenes or pentanes. Specific examples of suitable diluents include n-pentane, n-hexane, isooctane, cyclohexane, toluene, benzene, xylene and the like. The organomonolithium compounds (initiators) that are reacted with the polymerizable additive in step one of this invention are represented by the formula RLi; wherein R is an aliphatic, cycloaliphatic, or aromatic radical, or combinations thereof, preferably containing from 2 to 20 carbon atoms per molecule. Exemplary of these organomonolithium compounds are ethyllithium, n-propyllithium, isopropyllithium, n-butyllithium, sec-butyllithium, tertoctyllithium, n-decyllithium, n-eicosyllithium, phenyllithium, 2-naphthyllithium, 4-butylphenyllithium, 4-tolyllithium, 4-phenylbutyllithium, cyclohexyllithium, 3,5-di-n-hepthylcyclohexyllithium, 4-cyclopentylbutyllithium, and the like. The alkyllithium compounds are preferred for employment according to this invention, especially those wherein the alkyl group contains from 3 to 10 carbon atoms. A much preferred initiator is sec-butyllithium. See U.S. Pat. No. 3,231,635. The concentration of the initiator can be regulated to control molecular weight. Generally, the initiator concentration is in the range of about 0.25 to 50 millimoles per 100 grams of monomer although both higher and lower initiator levels can be used if desired. The required initiator level frequently depends upon the solutility of the initiator in the hydrocarbon diluent. These polymerization reactions are usually carried out at a temperature in the range of −60° to +300° F. and at pressures which are sufficient to maintain the reaction mixture in the liquid phase.

Next, the living polymer in solution is contacted with a conjugated diene. Preferred dienes include butadiene and isoprene. A much preferred diene is isoprene. The resulting living polymer has a simplified structure A—B—Li.

The C-Li polymer arms may be formed in a separate reactor employing an inert solvent, organomonolithium initiator and conjugated diene monomer. In an alternative embodiment, the C-Li arms may be formed in the same reactor as the AB-Li polymer arms. In that case, after the A-Li arms are formed, additional initiator is added. Then the conjugated diene monomer is added. In this alternative embodiment, the B and C arms will necessarily be similar in composition and molecular weight.

The molecular weights of the living polymer arms (A, B and C) may vary between wide limits. Suitable number average molecular weights are:

|   | Preferred | More Preferred |
|---|---|---|
| A | 3,000 to 30,000 | 10,000 to 20,000 |
| B | 15,000 to 100,000 | 25,000 to 60,000 |
| C | 15,000 to 100,000 | 25,000 to 60,000 |

Preferably, the composition and molecular weights of the B blocks and the C blocks are the same.

The living AB-Li and C-Li polymer arms are then reacted with a multifunctional coupling agent. A much preferred coupling agent is a polyalkenyl aromatic coupling agent. Polyalkenyl aromatic coupling agents capable of forming star-shaped polymers are known in the art. See generally Milkovich, Canadian Pat. No. 716,645; Crossland et al, U.S. Pat. No. 4,010,226; and Fetters et al, U.S. Pat. No. 3,985,830.

The polyalkenyl aromatic compounds that are employed in this step of the process are those polyvinyl aromatic compounds that have any of the following general formulas:

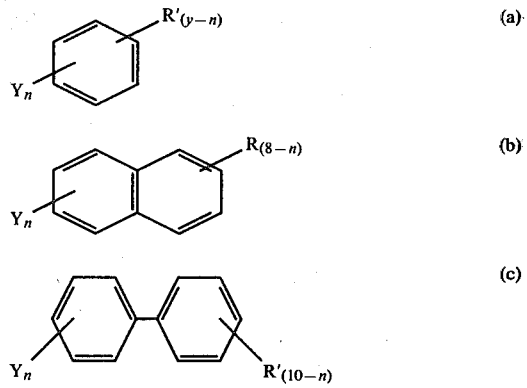

wherein Y is a vinyl group, and wherein each R' is hydrogen or an alkyl group containing from 1 to 4 carbon atoms with a total of the alkyl substituents having not more than 12 carbon atoms, and wherein n is an integer of 2 or 3. The vinyl substituents in the above formulas (b) and (c) can be on one or both rings. Exemplary of suitable polyvinyl aromatic compounds are:

1,2-divinylbenzene;
1,3-divinylbenzene;
1,4-divinylbenzene;
1,2,4-trivinylbenzene;
1,3-divinylnaphthalene;
1,8-divinylnaphthalene;
1,3,5-trivinylnaphthalene;
2,4-divinylbiphenyl;
3,5,4'-trivinylbiphenyl;
1,2-divinyl-3,4-dimethylbenzene;
1,5,6-trivinyl-3,7-diethylnaphthalene;
1,3-civinyl-4,5,6-tributylnaphthalene;
2,2'-divinyl-4-ethyl-4'-propylbiphenyl;

and the like. Divinyl aromatic hydrocarbons containing up to 26 carbon atoms per molecule are preferred for employment according to this invention; particularly divinylbenzene in either its ortho, meta, or para isomer and commercial divinylbenzene which is a mixture of said isomers is also quite satisfactory.

The polyalkenyl aromatic coupling agent should be added to the living polymer after the polymerization of the monomers is substantially complete, i.e., the agent should only be added after substantially all of the monomer has been converted to living polymers.

The amount of polyalkenyl aromatic coupling agent added may vary between wide limits but preferably at least 0.5 mole is used per mole of unsaturated living polymer. Amounts of from 1 to 15 moles, preferably from 1.5 to 5 moles are preferred. The amount, which may be added in two or more stages, is usually such so as to convert at least 80 or 85%w of the living polymers into star-shaped polymers, preferably at least 90%w are coupled.

The coupling reaction step may be carried out in the same solvent as for the polymerization reaction step. A list of suitable solvents is given above. The coupling reaction step temperature may also vary between wide limits, e.g., from 0° to 150° C., preferably from 20° to 120° C. The reaction may also take place in an inert atmosphere, e.g., nitrogen and under pressure e.g., a pressure of from 0.5 to 10 bars.

The star-shaped polymers prepared in reaction step (b) are characterized by having a dense center or nucleus of cross-linked poly(polyalkenyl coupling agent) and a number of arms of substantially linear unsaturated polymers extending outwardly therefrom. The number of arms may vary considerably but is typically between 6 and 25, preferably from about 8 to about 20. From the above it can be seen that Y is preferably a poly(divinylbenzene)nucleus. As stated above it is believed that the nuclei are cross-linked.

The coupled products obtained according to the present invention may then be hydrogenated, if desired, as described generally in the prior art, preferably so as to reduce at least about 90% of any olefinic bonds in the polymer chains. Suitably at least 50%, preferably at least 70%, more preferably at least 90%, most preferably at least 95% of the original olefinic unsaturation is hydrogenated. Since the star-shaped polymer is partly derived from a monoalkenyl arene compound, then the amount of aromatic unsaturation which is hydrogenated, if any, will depend on the hydrogenation conditions used. However, preferably less than 10%, more preferably less than 5% of such aromatic unsaturation is hydrogenated. The aromatic unsaturation of the nucleus may or may not be hydrogenated again depending upon the hydrogenation conditions used. The molecular weights of the hydrogenated star-shaped polymers correspond to those of the unhydrogenated star-shaped polymers.

The hydrogenation can be carried out in any desired way. A hydrogenation catalyst may be used, e.g., a copper or molybdenum compound. Compounds containing noble metals or noble-metal compounds can be used as hydrogenation catalysts. Preference is given to catalysts containing a non-noble metal or a compound thereof of Group VIII of the Periodic Table, i.e., iron, cobalt and in particular, nickel. As examples may be mentioned, Raney nickel and nickel on kieselguhr. Special preference is given to hydrogenation catalysts which are obtained by causing metal hydrocarbyl compounds to react with organic compounds of any one of the Group VIII metals iron, cobalt or nickel, the latter compounds containing at least one organic compound which is attached to the metal atom by means of an oxygen atom, for instance as described in U.K. patent specification No. 1,030,306. Preference is given to hydrogenation catalysts obtained by causing an aluminum trialkyl (e.g., aluminum triethyl (Al(Et)$_3$) or aluminum triisobutyl) to react with a nickel salt of an organic acid (e.g., nickel diisopropyl salicylate, nickel naphthenate, nickel 2-ethyl hexanoate, nickel di-tert-butyl benzoate, nickel salts of saturated monocarboxylic acids obtained by reaction of olefins having from 4 to 20 carbon atoms in the molecule with carbon monoxide and water in the presence of acid catalysts) or with nickel enolates or phenolates (e.g., nickel acetonylacetonate, the nickel salt of butylacetophenone).

The hydrogenation of the star-shaped polymer is very suitably conducted in solution in a solvent which is inert during the hydrogenation reaction. Saturated hydrocarbons and mixtures of saturated hydrocarbons are very suitable and it is of advantage to carry out the hydrogenation in the same solvent in which the polymerization has been effected.

A much preferred hydrogenation process is the selective hydrogenation process shown in Wald et al, U.S. Pat. No. 3,595,942. In that process, hydrogenation is conducted, preferably in the same solvent in which the polymer was prepared, utilizing a catalyst comprising the reaction product of an aluminum alkyl and a nickel or cobalt carboxylate or alkoxide. A favored catalyst is the reaction product formed from triethyl aluminum and nickel octoate.

Following the coupling reaction the product is neutralized such as by the addition of terminators, e.g., water, alcohol or other reagents, for the purpose of removing the lithium radical forming the nucleus for the condensed polymer product. The product is then recovered such as by coagulation utilizing hot water or steam or both.

A much preferred use of the polymers of the present invention is in adhesive compositions. Since the block copolymer by itself is not sufficiently tacky or sticky it is necessary to add a tackifying resin that is compatible with the elastomeric conjugated diene block. A much preferred tackifying resin is a diene-olefin copolymer of piperylene and 2-methyl-2-butene having a softening point of about 95° C. This resin is available commercially under the tradename Wingtack 95, and is prepared by the cationic polymerization of 60% piperylene, 10% isoprene, 5% cyclopentadiene, 15% 2-methyl butene and about 10% dimer. See South African Pat. No. 700,881. Other tackifying resins of the same general type may be employed in which the resinous copolymer comprises 20-80 weight percent of piperylene and 80-20 weight percent of 2-methyl-2-butene. The resins normally have softening points (ring and ball) between about 80° and about 115° C. Mixtures of resins having high and low softening points may also be used. Other tackifying resins which are also useful in the compositions of this invention include hydrogenated resins, esters of rosin, polyterpenes, terpenephenol resins, and polymerized mixed olefins. The amount of tackifying resin employed varies from about 50 to about 200 parts per hundred rubber (phr), preferably, between about 50 and about 150 phr.

The adhesive compositions of the instant invention also may contain plasticizers such as rubber extending or compounding oils. These rubber compounding oils are well-known in the art and include both high saturates content and high aromatic content oils. The amount of rubber compounding oil employed varies from about 0 to about 100 phr (parts by weight per hundred parts by weight rubber), preferably about 5 to about 60 phr.

Optionally, an arene-block-compatible resin may be employed. Compatibility is judged by the method disclosed in U.S. Pat. No. 3,917,607. Normally, the resin should have a softening point above about 100° C., as determined by ASTM method E 28, using a ring and ball apparatus. Mixtures of arene-block-compatible resins having high and low softening points may also be used. Useful resins include coumarone-indene resins, polystyrene resins, vinyl toluene-alphamethylstyrene copolymers, and polyindene resins. Much preferred is a coumarone-indene resin. The amount of arene-block-compatible resin varies from about 0 to about 200 phr.

The compositions of this invention may be modified with supplementary materials including pigments, fillers, and the like as well as stabilizers and oxidation inhibitors. Stabilizers and oxidation inhibitors are typically added to the commercially available compounds in order to protect the polymers against degradation during preparation and use of the adhesive composition. Combinations of stabilizers are often more effective, due to the different mechanisms of degradation to which various polymers are subject. Certain hindered phenols, organo-metallic compounds, aromatic amines and sulfur compounds are useful for this purpose. Especially effective types of these materials include the following:
1. Benzothiazoles, such as 2-(dialkyl-hydroxybenzyl-thio)benzothiazoles.
2. Esters of hydroxybenzyl alcohols, such as benzoates, phthalates, stearates, adipates or acrylates of 3,5-dialkyl-1 hydroxybenzyl alcohols.
3. Stannous phenyl catecholates.
4. Zinc dialkyl dithiocarbanates.
5. Alkyl phenols, e.g., 2,6-di-tert-butyl-4-methyl phenol.
6. Dilaurylthio-dipropionate.

Examples of commercially available antioxidants are "Ionox 220" 4,4-methylene-bis(2,6-di-t-butyl-phenol) and "Ionox 330" 3,4,6-tris(3,5-di-t-butyl-p-hydroxybenzyl)-1,3,5-trimethylbenzene, "Dalpac 4C" 2,6-di-(t-butyl)-p-cresol, "Naugawhite" alkylated bisphenol, "Butyl Zimate" zinc dibutyl dithiocarbamate, and "Agerite Geltrol" alkylated-arylated bis-phenolic phosphite. From about 0.01 percent to about 5.0 percent by weight of one or more antioxidants is generally added to the adhesive composition.

The adhesive compositions of the present invention may be prepared by either blending block copolymer, tackifying resin and other desired ingredients in a solvent, such as toluene, and removing the solvent by a stripping operation or they may be prepared by merely mixing the components at an elevated temperature, e.g., at about 150° C. (hot melt). In addition, if desired, the adhesive compositions may be cured, for example, by known irradiation techniques.

A preferred use of the present invention is in the preparation of pressure-sensitive adhesives tapes by a method such as that disclosed in U.S. Pat. No. 3,676,202 or in the manufacture of labels. The pressure-sensitive adhesive tape comprises a flexible backing sheet and a layer of the pressure-sensitive adhesive composition of the instant invention coated on one major surface of the backing sheet. The backing sheet may be a plastic film, paper or any other suitable material and the tape may include various other layers or coatings, such as primers, release coatings and the like, which are used in the manufacture of pressure-sensitive adhesive tapes.

The invention is further illustrated by means of the following illustrative embodiments, which are given for the purposes of illustration only and are not meant to limit the invention to the particular reactants and amounts disclosed.

Various standard tests are employed to measure the adhesive and cohesive characteristics of the adhesive compositions. Among these tests are Rolling Ball Tack, Pressure Sensitive Tape Council (PSTC) method PSTC 6; 180° Peel, PSTC 1; Holding Power to Steel and Kraft Paper, PSTC 7; and melt viscosity, ASTM D-3236 measured with Brookfield RVT with #29 spindle. The non standard SAFT test gives the temperature at which a 25×25 mm lap shear bond of tape to MYLAR or Kraft paper fails under a load of 1 kg when placed in an oven whose temperature is increased at 22° C. per hour.

Illustrative Embodiment I

In illustrative Embodiment I, an assymetric polymer of the general structure $(S-I)_x-Y-(I)$ was prepared. The scheme for preparation of the assymetric polymer was to prepare a living polystyrene-polyisoprene block polymer in reactor 1, to prepare a living polyisoprene homopolymer in reactor 2, to blend the two living polymer solutions in the proper proportions in reactor 3 and to couple the living polymer arms with a polyfunctional coupling agent to give the assymetric polymer in reactor 3. The details of each step are as follows:

Preparation of Living S-I Polymer in reactor 1: to a reactor was charged 63.75 pounds of cyclohexane, 11.25 pounds of styrene and 25.16 grams of sec-butyllithium (0.3931 gram-mol as a solution of 0.086 grams butyllithium per milliliter of cyclohexane). The styrene reaction was essentially complete after 30 minutes, during which time the reaction temperature was allowed to increase from 30° C. to 50° C.

To a second reactor was charged 65.96 pounds of cyclohexane and 11.64 pounds of isoprene. To this mixture was added 22.4 pounds of the living polystyryllithium solution from above. Polymerization of the polyisoprene block was essentially complete after about 60 minutes, during which time the reaction temperature was allowed to increase from 27° C. to 40° C.

Preparation of Living I Polymer in reactor 2: to a reactor was charged 85 pounds of cyclohexane, 15.0 pounds of isoprene and 9.66 grams of sec-butyllithium (0.151 gram-mol). Polymerization of the isoprene was essentially complete after about 60 minutes, during which time the reaction temperature was allowed to increase from 30° C. to 50° C.

Preparation of Assymetric Polymer in reactor 3: from reactor 1, 25 pounds of living polystyrene-polyisoprene polymer solution (3.75 pounds of polymer) was transferred to reactor 3. From reactor 2, 19.39 pounds of living polyisoprene polymer solution (2.91 pounds of polymer) was also transferred to reactor 3. After mixing the two living polymer solutions, 44.4 grams of 55%w pure divinylbenzene (equivalent to 3.2 to 1 molar ratio of divinylbenzene to living polymer chains) was added to reactor 3. The reaction mixture was then held at 60° C. for 60 minutes. After termination of any active sites by addition of methanol and after addition of 0.3%w (basis neat polymer) of phenolic antioxidant, the assymetric polymer was steam coagulated and dried.

Illustrative Embodiment II

In Illustrative Embodiment II, the new assymetric star-shaped polymer of Illustrative Embodiment I is compared with three other polymers prepared according to conventional technology. One of the polymers compared is a linear S-I-S block copolymer, similar to the polymers disclosed in U.S. Pat. No. 3,239,478. Another of the polymers compared is a symmetrical, star-shaped polymer having the general structure $(S-I)_{\overline{x}}Y$, prepared by the divinyl benzene coupling of living styrene-isoprene polymer arms. These star-shaped polymers are prepared by reacting the monomers with an organolithium compound followed by the addition of divinyl benzene (DVB) coupling agent. The use of DVB to form star polymers was first disclosed in Canadian Patent No. 716,645. Subsequent disclosures of star polymers made with DVB include U.S. Pat. Nos. 3,985,830; 3,949,020; 4,010,226; 4,248,980; 4,248,981; 4,248,982; 4,248,983; 4,248,984; and Belgian Pat. Nos. 848,028 and 848,106. The average number of arms in this symmetrical star-shaped polymer is about 8.6 (i.e., x equals 8.6 and Y is the residue of a divinyl benzene coupling agent). The third polymer is a linear, low-coupled styrene-isoprene block copolymer prepared according to U.S. Pat. No. 4,096,203. The various properties of these pure polymers are shown in Table 1 below:

strength of the network structure. Results in the table on the conventional low coupled linear polymer show that, as is known, reducing the coupling yield does indeed produce a lower tensile strength polymer.

The new assymetric star polymer also contains a lower fraction of load bearing arms and therefore, as shown in the table, has lower cohesive strength. However, contrary to the conventional low coupled linear polymer, the new assymetric star polymer has high coupling yield and therefore contains very little of the much lower molecular weight uncoupled polymer. The lower fraction of load bearing S-I arms, and thus the lower cohesive strength, of the new assymetric star polymer is achieved, not by reducing the coupling yield but rather by coupling a mixture of S-I and I arms, the I arms being non load bearing but being chemically bound to the polymer rather than being physically bound to the polymer through the polystyrene end-blocks as is the case when cohesive strength is reduced by merely reducing the coupling yield during preparation of a conventional low coupled linear polymer. The significance of this difference between this new approach to reduce polymer cohesive strength and the conventional approach to reduce polymer cohesive

TABLE 1

Properties of Pure Polystyrene-Polyisorpene Block Polymers

| Polymer | Conventional Linear Polymer | Conventional Star Polymer | New Assymetric Star Polymer | Conventional Low Coupled Linear Polymer |
|---|---|---|---|---|
| Styrene Content, % w | 13 | 12.5 | 11.7 | 13 |
| Coupling Yield, % w | 85 | 95 | 95 | 60 |
| Properties | | | | |
| Solution Viscosity[a], Pa · s | 1.6 | 2.6 | 0.82 | 0.90 |
| Hardness[b], Shore A | | | | |
| Instantaneous | 36 | 36 | 24 | 34 |
| 10 second | 35 | 36 | 21 | — |
| Tensile Properties[b,c] | | | | |
| 100% Modulus, MPa | 0.52 | 0.52 | 0.14 | — |
| 300% Modulus, MPa | 1.0 | 0.83 | 0.34 | 0.48 |
| 500% Modulus, MPa | 1.2 | 1.3 | 0.55 | — |
| 700% Modulus, MPa | 1.8 | 2.1 | 1.1 | — |
| Tensile Strength @ Break, MPa | 22.8 | 18.6 | 4.55 | 10.3 |
| Elongation @ Break, % | 1340 | 1220 | 1250 | 1400 |
| Set @ Break, % | 15 | 10 | 25 | 20 |

[a]Brookfield viscosity @ 25° C. of 25% w solution of polymer in toluene.
[b]Measured @ 25° C. on about 1 mm thick films cast from toluene in release paper lined pans.
[c]Measured according to ASTM D 412, Instron crosshead speed 250 mm/minute.

Results show that the S-I arms of both the conventional linear polymer and the conventional star polymer are coupled to high coupling yield. As a result, both polymers have relatively high solution viscosity, high hardness and high tensile strength. In order to produce a polymer having the desired lower cohesive strength, one must reduce the fraction of load bearing S-I arms coupled together in the coupling reaction, load bearing arms being those S-I arms which can participate in the well known "self vulcanizing" network structure characteristic of styrene-diene block copolymers. The conventional approach to a low cohesive strength polymer is merely to reduce the coupling yield during the coupling reaction and thereby achieve a lower fraction of S-I load bearing arms since the S-I arms which remain uncoupled cannot contribute significantly to the strength will be apparent when comparing properties of adhesives based on polymers exemplifying the two different approaches.

Illustrative Embodiment III

The polymers discussed in Illustrative Embodiment II were employed in two different adhesive formulations. Formulation #1 comprised 100 parts by weight of the block copolymer, 80 parts by weight Wingtack ® 95 resin and 1 part by weight antioxidant. Formulation #2 comprised 100 parts by weight block copolymer, 90 parts by weight Escorez ® 1310 (a 100° C. softening point, aliphatic hydrocarbon tackifying resin), 40 parts by weight Wingtack ® 10 (a 10° C. softening point, aliphatic hydrocarbon resin) and 1 part by weight antioxidant. The properties of the formulations are presented below in Table 2:

TABLE 2

Properties of Polystyrene-Polyisoprene Block Polymers in Adhesive Formulations

| Polymer | Conventional Linear Polymer | Conventional Star Polymer | New Assymetric Star Polymer | Conventional Low Coupled Linear Polymer |
|---|---|---|---|---|
| Properties in Formulation 1 | | | | |

TABLE 2-continued

Properties of Polystyrene-Polyisoprene Block Polymers in Adhesive Formulations

| Polymer | Conventional Linear Polymer | Conventional Star Polymer | New Assymetric Star Polymer | Conventional Low Coupled Linear Polymer |
|---|---|---|---|---|
| Rolling Ball Tack, cm | 1.4 | 2.9 | 1.4 | 1.5 |
| 180° Peel, N/m | 720 | 650 | 1020 | 1140 |
| Holding Power, Hrs | | | | |
| To Steel @ 25° C., 13 × 13 mm, 2 kg | >70 | >70 | >70 | 40 |
| To Kraft @ 25° C., 13 × 13 mm, 2 kg | >70 | >70 | >70 | 60 |
| To Kraft @ 60° C., 25 ×25 mm, 1 kg | >40 | >40 | >40 | 15 |
| SAFT to MYLAR, °C. | 108 | 101 | 105 | 99 |
| SAFT to Kraft, °C. | 90 | 87 | 97 | 84 |
| Melt Viscosity @ 177° C., Pa · s | 600 | >2000 | 1600 | 300 |
| Properties in Formulation 2 | | | | |
| Rolling Ball Tack, cm | 1.0 | 4.0 | 1.0 | 1.0 |
| 180° Peel, N/m | 680 | 880 | 790 | 1050 |
| Holding Power, Hrs | | | | |
| To Steel @ 25° C., 13 × 13 mm, 2 kg | 1.6 | 3.3 | 1.3 | 1.0 |
| To Kraft @ 25° C., 13 × 13 mm, 2 kg | 2.4 | 0.6 | 1.8 | 1.0 |
| To Kraft @ 60° C., 25 × 25 mm, 1 kg | 13 | 36 | 10 | — |
| SAFT to MYLAR, °C. | 91 | 87 | 91 | 79 |
| SAFT to Kraft, °C. | 72 | 72 | 83 | 66 |
| Melt Viscosity @ 177° C., Pa · s | 65 | 300 | 90 | 35 |

Results show that adhesives based on each of the four polymers have a good balance of tack, peel strength and holding power at near room temperature in both formulations although the conventional low coupled linear polymer has somewhat lower holding power. The surprising differences among the polymers are apparent in their performance at elevated temperatures. The differences are most clearly shown by the performance of the polymers in the SAFT test.

Compared to the conventional linear polymer adhesive, the conventional star polymer adhesive has the same or somewhat poorer SAFT to both MYLAR and Kraft paper. The limitation of the conventional approach to a low cohesive strength polymer is clearly demonstrated by the lower SAFT values found for the conventional low coupled linear polymer adhesive compared to the conventional linear polymer adhesive. The advantage of the new assymetric star polymer approach to a low cohesive strength polymer over the conventional approach is well established by the SAFT values. Following this new approach, the cohesive strength of the polymer can be reduced without having to sacrifice adhesive service temperature. That is, as shown in Table 2, the new assymetric star polymer adhesive has about the same SAFT to MYLAR as the conventional linear polymer adhesive. Surprisingly, the new assymetric star polymer adhesive has even higher SAFT to Kraft than the conventional linear polymer adhesive.

What is claimed is:

1. A block copolymer having the star-shaped, asymmetrical structure $$(A-B)_x-Y-(C)_z$$

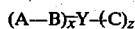

where A is a polymer block of a monoalkenyl arene, B is a polymer block of a conjugated diene, C is a polymer block of a conjugated diene, Y is the residue of a multifunctional coupling agent, the sum of x plus z is greater than 6 and less than about 25, the ratio of x to z is between about 5 to 1 and about 1 to 5, the molecular weight of each block A is between about 3,000 and about 30,000, the molecular weight of each block B is between about 15,000 and about 100,000, and the molecular weight of each block C is between about 15,000 and about 100,000.

2. The block copolymer of claim 1 wherein said A block is a polystyrene block and said B blocks and said C blocks are selected from the group consisting of polybutadiene blocks, polyisoprene blocks and poly(butadiene-isoprene)blocks.

3. The block copolymer of claim 2 wherein said B blocks and said C blocks are polyisoprene blocks.

4. The block copolymer of claim 1 wherein x is an integer between 2 and 28 and z is an integer between 2 and 28.

5. The block copolymer of claim 1 wherein Y is the residue of a polyalkenyl aromatic coupling agent.

6. The block copolymer of claim 5 wherein said coupling agent is divinyl benzene.

7. The process for preparing the block copolymer of claim 1 comprising:

(a) solution polymerizing a monalkenyl arene under polymerization conditions at a temperature between about −75° C. to +150° C. with an organomonolithium compound, therein forming a living A-Li polymer arm having a molecular weight between about 3,000 and 30,000;

(b) contacting said living A-Li polymer arm with a conjugated diene monomer therein forming a living AB-Li polymer arm having a molecular weight between about 15,000 and 100,000;

(c) solution polymerizing a conjugated diene under polymerization conditions at a temperature between about −75° C. to +150° C. with an organomonolithium compound, therein forming a living C-Li polymer arm having a molecular weight between about 15,000 and 100,000;

(d) mixing the solution of living AB-Li polymer arms with the solution of living C-Li polymer arms; and (e) contacting the resulting mixture with at least 0.5 mole per mole of living polymer of a multifunctional coupling agent at a temperature between about 0° C. and about 150° C. therein forming said, asymmetric star-shaped polymer.

8. The process according to claim 7 wherein said multifunctional coupling agent is a polyalkenyl aromatic coupling agent.

9. The process according to claim 8 wherein said polyalkenyl aromatic coupling agent is divinyl benzene.

10. The process for preparing the block copolymer of claim 1 wherein the conjugated diene employed for block B is the same as the conjugated diene employed for block C, said process comprising:
(a) solution polymerizing a monoalkenyl arene under polymerization conditions at a temperature between about $-75°$ C. to $+150°$ C. with an organomonolithium compound, therein forming a living A-Li polymer arm having a molecular weight between about 3,000 and 30,000;
(b) adding an additional amount of organomonolithium compound to the solution of living A-Li polymer arms;
(c) contacting the resulting solution with a conjugated diene monomer therein forming a mixture of living AB-Li arms and living C-Li arms each having a molecular weight between about 15,000 and 100,000; and
(d) contacting the resulting mixture with at least 0.5 mole per mole of living polymer of a multifunctional coupling agent at a temperature between about 0° C. and about 150° C., therein forming said, asymmetric star-shaped polymer.

11. The process according to claim 10 wherein said multifunctional coupling agent is a polyalkenyl aromatic coupling agent.

12. The process according to claim 11 wherein said polyalkenyl aromatic coupling agent is divinyl benzene.

13. A selectively hydrogenated block copolymer having the star-shaped, asymmetrical structure $$(A-B)_x Y + C)_z$$

where A is a polymer block of a monoalkenyl arene, B is a substantially hydrogenated polymer block of a conjugated diene, C is a substantially hydrogenated polymer block of a conjugated diene, Y is the residue of a multifunctional coupling agent, the sum of x plus z is greater than 6 and less than about 25, the ratio of x to z is between about 5 to 1 and about 1 to 5 and the molecular weight of each block A is between about 3,000 and about 30,000, the molecular weight of each block B is between about 15,000 and about 100,000, and the molecular weight of each block C is between about 15,000 and about 100,000.

14. The block copolymer of claim 13 wherein said A block is a polystyrene block and said B blocks and said C blocks are selected from the group consisting of substantially hydrogenated polybutadiene blocks, substantially hydrogenated polyisoprene blocks and substantially hydrogenated poly(butadiene-isoprene) blocks.

15. The block copolymer of claim 13 wherein x is an integer between 2 and 28 and z is an integer between 2 and 28.

16. The block copolymer of claim 13 wherein Y is the residue of a polyalkenyl aromatic coupling agent.

17. The block copolymer of claim 16 wherein said coupling agent is divinyl benzene.

* * * * *

REEXAMINATION CERTIFICATE (738th)

United States Patent [19]

St. Clair

[11] B1 4,391,949

[45] Certificate Issued Aug. 4, 1987

[54] ASYMMETRIC BLOCK COPOLYMERS AND CORRESPONDING ADHESIVE FORMULATIONS

[75] Inventor: David J. St. Clair, Houston, Tex.

[73] Assignee: Shell Oil Company, Houston, Tex.

Reexamination Request:
No. 90/001,014, May 23, 1986

Reexamination Certificate for:
Patent No.: 4,391,949
Issued: Jul. 5, 1983
Appl. No.: 320,233
Filed: Nov. 12, 1981

Disclaimer of claims 1–17 filed: Sep. 22, 1986 (1077 O.G. 34)

[51] Int. Cl.$^4$ .................. C08L 9/00; C08F 293/00
[52] U.S. Cl. .................. 525/99; 525/193; 525/250; 525/314; 524/274; 524/505
[58] Field of Search .................. 525/250

[56] References Cited

U.S. PATENT DOCUMENTS

| | | | |
|---|---|---|---|
| 4,163,764 | 8/1979 | Nash | 525/314 |
| 4,346,193 | 8/1982 | Warfel | 525/250 |

FOREIGN PATENT DOCUMENTS 0997889  9/1976  Canada .................. 525/250

Primary Examiner—Wilbert W. Briggs

[57] ABSTRACT

A novel block copolymer having particular utility in adhesive compositions has the structure $(A-B)_x Y(-C)_z$ where A is a poly(monoalkenyl) block, B and C are poly(conjugated diene) polymer blocks, Y is the residue of a multifunctional coupling agent, and x plus z is greater than 6. Also disclosed are adhesive compositions containing such block copolymers.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-17 are now disclaimed.

* * * * *